UNITED STATES PATENT OFFICE.

RICHARD RÜCKFORTH, OF STETTIN, GERMANY.

PROCESS OF MAKING NUTRITIVE EXTRACTS FROM YEAST.

SPECIFICATION forming part of Letters Patent No. 648,468, dated May 1, 1900.

Application filed March 31, 1899. Serial No. 711,256. (No specimens.)

*To all whom it may concern:*

Be it known that I, RICHARD RÜCKFORTH, residing at Stettin, Germany, have invented certain new and useful Improvements in or Relating to the Treatment of Yeast, (for which I have made application for Letters Patent in Great Britain under No. 4,709, dated March 3, 1899,) of which the following is a specification.
As is known, it is possible in accordance with the experiments of Pictet and Yung to expose yeast to intense cold without injuring its vitality. In fact, microscopical investigations have disclosed no visible changes.
In my experiments I have found that yeast in a frozen state when suddenly or rapidly heated loses its vitality, the cells bursting at temperatures which are below that at which the protein substances contained therein coagulate. There is, therefore, here a simple means of securing the cell contents specially rich in protein substances in far greater quantities than can be obtained by means of other methods, for in the latter the temperatures required are so high that the total or partial coagulation of the protein matter cannot be avoided. This process, therefore, consisting in first congealing the yeast, then destroying its vitality by a sudden raising of temperature in order to obtain the contents of the cells, forms the principal object of my invention.

The process itself is very simple. After having washed and cleaned the yeast it is exposed in suitable vessels for such a length of time to a temperature below 0° centigrade (32° Fahrenheit) as to congeal it. Refrigerating-machines may be advantageously used for this purpose. It is advisable to subject the yeast to a freezing temperature of, say, $-12°$ to $-15°$ centigrade for a time, so that the yeast will congeal into a hard mass, which can afterward be crushed. The yeast having arrived at the latter state, the required amount of heat must be rapidly supplied. This can be done in the following manner: The yeast after having been crushed is heated to the required temperature (which may vary according to ulterior purposes) by water of the desired temperature. The yeast-cells are thereby destroyed or broken. The same effect is likewise secured by first crushing the frozen mass between ordinary crushing-rollers and afterward passing it over or between heated cylinders, such as are employed in cardboard or glazing machines. The cylinders may be replaced by heated plates or any other device serving the purpose. To obtain the protein of the mass after it has thus been heated, it is pressed or the protein is lixiviated by water at a temperature at which the protein contained in the yeast does not coagulate, the admixture of a small quantity of some acid being of great advantage, inasmuch as it prevents decomposition of the protein. It is also possible at this stage of the process to treat the mass with proteolytic ferments, which will, the yeast-cells being destroyed or burst, digest the albumen more energetically than when the ferments are added to untreated yeast, treating the yeast directly at a temperature of, say, 38° centigrade with pepsine and hydrochloric acid.

I claim—

1. The process of treating yeast consisting in freezing the mass, and subjecting the same to a sudden increase of temperature, whereby the yeast-cells are burst without coagulating their contents, substantially as set forth.

2. The process of treating yeast consisting in freezing the mass, then dividing the same and finally subjecting the divided particles to a sudden increase of temperature, whereby the yeast-cells are burst without coagulation of the contents of said cells.

3. A process for the treatment of yeast, consisting in congealing the yeast, rapidly heating to a temperature of about 42° centigrade to destroy the cells, and then adding proteolytic ferments.

In testimony that I claim the foregoing as my invention I have signed my name in presence of two subscribing witnesses.

RICHARD RÜCKFORTH.

Witnesses:
HENRY HARGEOR,
JOHN E. KEHL.